(12) United States Patent
Klimas et al.

(10) Patent No.: US 11,931,818 B2
(45) Date of Patent: Mar. 19, 2024

(54) METHOD FOR NON-DESTRUCTIVELY TESTING A QUALITY OF AN ULTRASONIC WELD

(71) Applicant: Lisa Draexlmaier GmbH, Vilsbiburg (DE)

(72) Inventors: Felix Klimas, Langquaid (DE); Thomas Herzing, Landshut (DE); Lutz Lehmann, Landshut (DE); Daniel Zemann, Landshut (DE)

(73) Assignee: Lisa Dräxlmaier GmbH (DE)

(*) Notice: Subject to any disclaimer, the term of this patent is extended or adjusted under 35 U.S.C. 154(b) by 112 days.

(21) Appl. No.: 17/497,390

(22) Filed: Oct. 8, 2021

(65) Prior Publication Data

US 2022/0023979 A1    Jan. 27, 2022

Related U.S. Application Data

(63) Continuation of application No. PCT/EP2020/059139, filed on Mar. 31, 2020.

(30) Foreign Application Priority Data

Apr. 9, 2019    (DE) .................. 10 2019 109 263.9

(51) Int. Cl.
*B23K 20/10*    (2006.01)
*B23K 31/12*    (2006.01)
(Continued)

(52) U.S. Cl.
CPC ............ *B23K 20/10* (2013.01); *B23K 20/106* (2013.01); *B23K 31/125* (2013.01); *G01N 29/12* (2013.01);
(Continued)

(58) Field of Classification Search
CPC .... B23K 20/10; B23K 20/106; B23K 31/125; G01N 29/4481; G01N 29/46;
(Continued)

(56) References Cited

U.S. PATENT DOCUMENTS 6,308,881 B1    10/2001    Hesse et al.
8,783,545 B2    7/2014    Hesse et al.
(Continued)

FOREIGN PATENT DOCUMENTS

EP    0208310    1/1987
EP    2946869    11/2015
(Continued)

OTHER PUBLICATIONS

"Ultrasonic welding—Article about ultrasonic welding" by The Free Dictionary, downloaded Aug. 14, 2023, copyrighted 1981-2023 (Year: 1981).*

(Continued)

*Primary Examiner* — Lisa M Caputo
*Assistant Examiner* — Rose M Miller
(74) *Attorney, Agent, or Firm* — Burris Law, PLLC

(57) ABSTRACT

A method for non-destructive testing of a quality of an ultrasonic weld from a welding process includes detecting of a time-dependent measurement value over a period of time, where the measurement value is characteristic of a mechanical or electrical vibration behavior of a welding process to be tested. The method includes evaluating a measurement-value course of the detected time-dependent measurement value by using a Fourier analysis. The method further includes comparing a result of the evaluation to a reference value in order to test the quality of the weld. A measuring device and an ultrasonic welding system are also included.

16 Claims, 7 Drawing Sheets

(51) Int. Cl.
    *G01N 29/12*     (2006.01)
    *G01N 29/44*     (2006.01)
    *G01N 29/46*     (2006.01)

(52) U.S. Cl.
    CPC ......... *G01N 29/4481* (2013.01); *G01N 29/46* (2013.01); *G01N 2291/012* (2013.01); *G01N 2291/018* (2013.01); *G01N 2291/267* (2013.01)

(58) Field of Classification Search
    CPC ....... G01N 2291/012; G01N 2291/018; G01N 29/12; G01N 2291/267
    USPC .......................................................... 73/588
    See application file for complete search history.

(56) References Cited

U.S. PATENT DOCUMENTS

| | | | |
|---|---|---|---|
| 9,981,337 B2 * | 5/2018 | Simon | .................... G01N 29/12 |
| 2003/0218050 A1 | 11/2003 | Kanemoto et al. | |
| 2009/0283569 A1 | 11/2009 | Ramaswamy et al. | |
| 2019/0271669 A1 | 9/2019 | Suter et al. | |
| 2022/0023978 A1 * | 1/2022 | Klimas | ................ B23K 20/123 |

FOREIGN PATENT DOCUMENTS

| | | | | | |
|---|---|---|---|---|---|
| JP | 2004047944 | A | * | 2/2004 | ........... B23K 20/005 |
| JP | 4920160 | B2 | * | 4/2012 | ........... B06B 1/0618 |
| KR | 20180096477 | A | * | 8/2018 | |
| KR | 1020180095776 | | | 8/2018 | |

OTHER PUBLICATIONS

"Ultrasonic bonding—Article about ultrasonic bonding" by The Free Dictionary, downloaded Aug. 14, 23, copyrighted 2003 (Year: 2003).*

"Ultrasonic Bonding: How it Works & Applications" by Stéphane Melançon, Dec. 22, 2021 (Year: 2021).*

International Search Report for International Application PCT/EP2020/059139, dated Jul. 24, 2020.

* cited by examiner

METHOD FOR NON-DESTRUCTIVELY TESTING A QUALITY OF AN ULTRASONIC WELD

CROSS-REFERENCE TO RELATED APPLICATIONS

This application is a continuation of International Application No. PCT/EP2020/059139, filed on Mar. 31, 2020, which claims priority to and the benefit of DE 10 2019 109 263.9, filed on Apr. 9, 2019. The disclosures of the above applications are incorporated herein by reference.

FIELD

The present disclosure relates to a method for non-destructive testing of the quality of an ultrasonic weld, a measuring device, and an ultrasonic welding system.

BACKGROUND

The statements in this section merely provide background information related to the present disclosure and may not constitute prior art.

With ultrasonic welding, the quality of weld is determined by a microscopic surface, in which a materially-bonded connection exists between the joining parts due to the weld. The formation of a materially-bonded connection cannot be quantified. It can also not be determined with certainty whether a materially-bonded connection is present at all without subjecting the weld to a destructive test, wherein the maximum breaking force required for separating the joining partners is used as criterion for the weld quality. Sample-type destructive tests of this type serve in manufacturing in the context of a statistical process control of quality assurance. Due to often low batch sizes with such samples, process control cannot be cleanly carried out statistically. A destructive test of, for example, 5 samples, usually takes place at regular intervals and after different events, such as a layer change or a retrofitting, the breaking force of all such samples must fall above an intervention limit that is often arbitrarily fixed.

In current systems only the weld time is measured as a monitoring criterion. With given welding parameters, a target time that must not be exceeded beyond a certain amount is determined by repeated experimentation.

The ability of welding systems to produce reliable welds of high quality can be impaired in various ways. Gradual signs of wear of components of the vibration system can result (for example, of piezo actuators), wherein it is not clear how long they already affect the weld quality of individual welds before this quality reduction is visible by a breakage test in the context of the statistical process control. In addition, it is not possible to differentiate the cause for the quality reduction from the breakage test. In manufacturing it can thereby not be decided whether the welds that have preceded a negative breakage test were already unacceptable. In a manufacturing line with subsequent processing processes, these potentially unacceptable welds can also no longer be rejected and in part not even detected again.

Due to small batch sizes of the daily production, the systems must often be converted again. Significant time pressure often prevails here. A low weld quality is indeed noticeable here from the prescribed breakage test after the setup process, but the cause of the quality reduction is unknown.

SUMMARY

This section provides a general summary of the disclosure and is not a comprehensive disclosure of its full scope or all of its features.

The present disclosure provides an improved concept for testing a quality of an ultrasonic weld.

Measuring and evaluation of quantities that characterize a vibration process during the weld process make possible a comprehensive and meaningful evaluation of the weld process.

According to a first aspect, the present disclosure provides a method for non-destructive testing of the quality of an ultrasonic weld, which is effected by a weld process comprising:

detecting a time-dependent measurement value over a period of time, wherein the measurement value is characteristic of a mechanical or electrical vibration behavior of the weld process to be tested;

evaluating a measurement-value course of the detected time-dependent measurement value by using a Fourier analysis; and comparing a result of the evaluation to a reference value in order to test the quality of the ultrasonic weld.

The detected time-dependent measurement value is evaluated by using a Fourier analysis. The result of the evaluation is compared to a reference value in order to test the quality of the weld. The reference value can be seen as the target value, i.e., the reference value specifies how the result of the evaluation should appear. The time-dependent measurement value is a measurable physical value that correlates to the welding process. The quality of the ultrasonic weld can be a level of quality of the ultrasonic weld. That is, the quality of the ultrasonic weld describes how reliably or well the ultrasonic welding has been carried out, and its durability.

A weld system can comprise an ultrasound generator that is configured to generate a control signal for generating an ultrasonic vibration. The control signal can be an electrical signal that can excite a piezo actuator to carry out a mechanical vibration. A sonotrode can be mechanically coupled to the piezo actuator in order to mechanically transfer an ultrasonic vibration of the piezo actuator to a workpiece.

The time-dependent measurement value can be a variable dependent on time. Since welds often carried out under different conditions do not differ substantially in their average value or a single Fourier transform over the entire welding process, but rather only in the shape of their curve, when the physical values are applied against the time it is advantageous to detect the measurement value in a time-dependent manner.

The use of a Fourier analysis can comprise the use of a short-term Fourier analysis, from which the temporal dependence of the amplitude, frequency, or other values can be determined. Individual window sections of the short-term Fourier analysis can refer back to a suitable window function, in particular a flattop window in the calculation of an amplitude, a rectangular window in the calculating of a frequency or a phase. Zero padding and interpolation can also be used, in particular in the calculation of a frequency with a short-term Fourier analysis with small window values.

The present disclosure provides that the vibration analysis is a 100% process control that serves for the reliable classification and the rejecting of poor welds. The use is thus the detection of all limitations relevant to the strength of the weld. Various contaminants that reduce the friction between the joining parts (lubricating grease, hand cream, etc.) can be distinguished from "good" welds based on reduced operating frequency. The surface condition (roughness, oxide layer) also has the same influence on the regulating of the operating frequency.

Since the breakage strength of the welds can sometimes change significantly after a batch change, it should also be reflected in the vibration analysis. Tests show that a decrease of the strength is noticeable from increased impedance and reduced operating power, which higher reactive power makes noticeable for this purpose. Different workpieces, in particular a different line construction, for example, with highly flexible strands or standard strands, impact the temporal course of a significant number of physical values. It can be seen here that the analysis of the entire temporal course is advantageous. In an analogous manner other properties that influence the rigidity of the strands, such as, for example, the length of the stripped part of the wire are also visible in the vibration analysis. However, the line length does not manifest in the measurement data, since the influence of the joining-part dimensions is to be carried only in rigid bodies, in which standing waves can form. For this purpose stranded lines have a too-strong damping. In contact parts, however, resonance effects can occur if they have a critical design with respect to natural frequencies. It can be determined by the vibration analysis whether cracks have arisen in such due to voltage increases.

In addition to the rejecting of poor welds, as a further application it is possible to use the vibration analysis for parameter optimization. A maximum breakage force can be optimized. With the vibration analysis it can be efficiently optimized toward certain electrical or mechanical target curves.

In addition, the vibration analysis also makes possible a supporting in the search for causes of poor weld quality. In the case of the exclusive presence of low breakage forces, no statement can be made about the cause. A visual inspection can differentiate between under- and over-welding. However, the complete dynamics of the weld process are visible from the vibration analysis.

The present disclosure has the advantage that in addition to the deflection, other measurement values are measured, in particular current and voltage; phase relationships and values derived therefrom, such as impedance and power, can thereby be calculated, and all of these values can be calculated as time-dependent values over the entire weld process, instead of calculating only two scalar numerical values per weld. The deflection can be measured in particular by an eddy current sensor. With a 100% process control by vibration analysis, wear phenomena are made noticeable in a change in the vibration dynamics. The vibration analysis makes possible a localization of faults, and thus an efficiency increase in the setup process.

In one form, the duration of the weld process corresponds to the period.

All measurement values can be measured over the entire weld time, i.e., the duration of the weld process. In multi-stage weld processes, an evaluation with respect to the individual stages can thus also be effected. In these cases additional information can be obtained, since different physical conditions prevail in the joining zone for the vibration system during the individual steps, and thus different boundary conditions apply for the vibration system. Welds are subdivided, for example, into pre-oscillation, compacting oscillation, welding oscillation, and post-oscillation. In particular, in aluminum welding processes, all four steps, significantly separated from intervals, without acoustic excitation, are carried out; in copper welding processes, pre-oscillation and welding oscillation can be sufficient.

In one form, the measurement value is characteristic of a mechanical vibration behavior of the welding process, and comprises a shear force and/or a deflection of a sonotrode.

The measuring of the deflection can be effected at different locations of the system. A measuring point as close as possible to the coupling surface of the sonotrode can allow direct conclusions about the movement in the joining zone. For space reasons, in particular for avoiding interference from the worker, the end of the sonotrode opposite the coupling surface can also be measured, and conclusions can be drawn about the movement on the coupling surface, in particular in linear welding.

The measuring of the deflection can be effected with different measuring methods. The deflection can correspond to the speed. For example, the deflection can be measured by a device wherein an eddy current sensor is brought up as close as possible to the sonotrode surface, which is orthogonal to the movement direction and thus at right angles to the coupling surface. The measuring point should be located as close as possible to the coupling surface in order to obtain a precise as possible measuring of the movement in the joining zone. The eddy current sensor is particularly suitable for this task, since it can be relatively easily attached to different locations of the vibration system. The limitation for the worker can thereby be lower here than in a measuring with laser-optic systems, such as, for example, laser vibrometry.

If the normal force of the sonotrode is known, then the shear force can be estimated using a plurality of force sensors on the anvil.

In one form, the measurement value is characteristic of an electrical vibration behavior of the welding process, and comprises an electrical current and/or an electrical voltage for controlling a piezo actuator.

The measuring of the electrical measurement values is connected to little effort and delivers precise results and has a low disturbance impact on the manufacturing process.

The measuring of the electrical measurement values can be effected using a high-voltage probe head and/or a current measurement clamp on a current path between generator and piezo actuator, in particular on a high-frequency cable. The measurement can also be directly integrated into the ultra-sound generator, where such measurements can also be carried out at the end stage in the context of the control cycle.

With the vibration measurement, as measured values voltage and current on an end of the vibration system, in particular on the piezo actuator, or a shear force and a deflection that corresponds to a speed measurement, can be measured at the other end, in particular at the coupling surface of the sonotrode, and evaluated using the method of Fourier analysis. In one form, the measurement values can be measured over the entire welding process. Individual ones of these measurement values can be measured. If a plurality of the above-mentioned measurement values is measured, this can increase the informative value of the analysis. The electrical measurement can be easy to realize. The mechanical measurement can provide information about what happens in the joining zone in terms of vibration technology.

In one form, the detecting of a measurement value comprises the detecting of a differential value and a flow value.

In one form, the evaluation comprises a calculating of a phase relationship of two detected measurement values, an operating frequency for operating a sonotrode, an amplitude of a phase of a detected measurement value, and/or an amplitude of the operating frequency for operating the sonotrode.

In one form, the evaluation further comprises a deriving of a power value, in particular an apparent power, an active power, a reactive power, and/or an impedance value, in particular apparent resistance, resistance, reactance, from the calculated phase relationship of two detected measurement values.

The measuring of a differential value and a flow value can be effected electrically, in particular by measuring voltage and/or current, or mechanically, in particular by measuring force and/or speed.

From the differential values and flow values associated with the measured values, in particular voltage and current, four values can be derived: their phase ratio, the operating frequency, and the respective amplitudes; in particular the course of the amplitudes is the same with all four measurement values; it can thus be derived from all measurement values. From these four basic values, power values, in particular apparent power, active power, reactive power, and impedance values, in particular apparent resistance, resistance, reactance, can be derived.

In one form, the evaluation is based on a fundamental oscillation and/or a harmonic of the detected measurement value.

The above-mentioned measurement values can be calculated not only for the fundamental oscillation, but also for the harmonics, i.e., in principle for each harmonic that can still be calculated with the given sample rate. It has been shown that some effects can be made better visible with higher harmonics.

In one form, the comparing comprises a comparing of an operating frequency and/or a phase difference between an electrical current and an electrical voltage for controlling a piezo actuator.

In one form, a reference value determination precedes the detecting and is based on a test series and/or on a self-learning algorithm, in particular using a neural network.

In this way a quality monitoring can be implemented. If it is established by experiments that there is a connection between certain quality deficiencies of joining parts or welds and the corresponding temporal courses, determined according to the above method, of the analyzed values, criteria can be determined according to which welds that have sufficiently similar characteristic courses to poor welds can be rejected. If no criteria are found according to which the temporal courses of poor welds differ from the temporal courses of good welds with sufficient significance, a quality monitoring can be realized using similar means to the already existing welding monitoring by receiving the welding time. Similar to this, wherein a target welding time is learned, and the subsequent welds can only differ therefrom by a certain amount, a monitoring can also be realized here by comparison to learned target curves. A fixed band from repeated experiments is conceivable, within which welds have sufficient breakage force and are thus classified as "good," and within which the curves of subsequent welds must be located in order to themselves be classified as "good." If the curves are located within this band, it can be concluded with statistical certainty that these welds also have the same quality as those destructively tested during the phase of learning from repeated experiments.

Certain physical values are well suited as differentiation criterion between good and poor welds. These include the values operating frequency and phase difference between current and voltage, and derived therefrom the reactance and the operating power, as well as the harmonic distortion of the current measurement. In particular it can be determined that contaminants that reduce the friction between the joining parts, such as, for example, lubricating grease or hand cream, and therefore lead to insufficient material bonding, i.e., to welds with low breakage force, lead to a reduction of the operating frequency over the entire welding process. With aluminum welds this applies both to the compression vibration and to the welding vibration. With controlled applying of lubricating grease or hand cream, the reduction of the frequency is already statistically significant, and after a short regulation time amounts over the entire welding process to approximately 50 Hz (average value to average value of the respective samples), with application of greater amounts of contamination up to 100 Hz.

Due to the quality monitoring, a suitable classification of the welds into good and poor welds can be carried out, so that quality deficiencies are recognized as reliably as possible. Since the maximum breakage force by destructive testing is currently the only quality criterion for the forming of a materially-bonded connection, the classification by vibration analysis should be as congruent as possible with a classification by destructive testing. Welds whose breakage force thus falls below an intervention limit should be detected as reliably as possible as poor welds by the vibration analysis.

From one or more of the temporal courses of the physical measurement values, a criterion can be isolated that has as small as possible a number of classification errors as classifier, in particular a high sensitivity or separation precision, i.e., a high probability for avoiding a type II error, i.e., the classification of a poor weld as a good weld. In addition to a high sensitivity, a high selectivity, i.e., the avoidance of type I errors, i.e. the classification of a good weld as a poor weld, is desirable.

The selectivity can be controlled by a prescribed limit, the significance level. Since sensitivity and separation precision cannot be simultaneously maximized, a large-as-possible difference of the average values and a low dispersion of the distributions to be classified is advantageous for a sufficient selectivity. It would also be possible to further increase the separation precision, for example by an increase of the sample number during repeated experiments, since the standard error is thereby reduced, but during production a small-as-possible sample number for repeated experimentation is desired.

These conditions are given, for example, in an experiment with contact parts coated in a controlled manner with hand cream for the operating frequency. From the difference of the average values and the respective standard deviations, a high separation precision results that allows a reliable classification without having a low selectivity that is disruptive to manufacturing, i.e., without often generating waste due to welds incorrectly being classified as bad.

As an extension of the presented method it is also possible to implement self-learning algorithms using pattern recognition. With a large amount of data over the temporal courses of the analyzed values of the vibration analysis and the associated breakage forces, a classifier could thus be implemented by a neural network. If over a long period of time and system-wide the data can also reliably differentiate between good and poor welds, the repeated experiment phase can be omitted.

In one form, the method comprises a regulating of the welding process based on a result of the comparison. An adapting of the welding system can thereby be effected in ongoing operation.

In one form, the method comprises an adapting of a parameter of a welding system carrying out the welding process, based on the result of the comparison.

In the above-described method the result of the regulating process of the system can be analyzed, in one form, the frequency used by the generator as a regulating variable in order to derive therefrom a classification of the welds into good and poor welds. However, the methods described can also be integrated into a regulating of the welding system. With respect to the quality, it is no longer analyzed to classify but to improve quality. In other words, it is no longer about recognizing poor welds, but to avoid them.

In one form, the method comprises a vibration analysis for representing the dynamics of the welding process, based on the comparison, in order to detect an under- or an over-welding.

According to a second aspect, the present disclosure provides a measuring device for non-destructive testing of a quality of an ultrasonic weld, which is configured to detect a measurement value over a period of time, wherein the measurement value is characteristic of a mechanical or electrical vibration behavior of a welding process to be tested; to evaluate the recorded time-dependent measurement value by using a Fourier analysis; and to compare a result of the evaluation to a reference value in order to test the quality of the weld.

According to a third aspect, the present disclosure provides an ultrasonic welding system comprising a sonotrode for applying a mechanical force to a workpiece; a piezo actuator that is configured to translate an electrical control signal into a mechanical vibration and transmit it to the sonotrode; an ultrasound generator that is configured to provide the electrical control signal; and a measuring device according to the second aspect.

The characterization of the system state and the detection connected thereto of damage makes possible a targeted exchanging of worn parts precisely when the wear is noticeable and thus has an impact on the weld quality. The replacement times of the system equipment, performed at fixed prescribed times or as desired, can be replaced by flexible, requirements-oriented, and thus also more cost-effective replacement times.

Furthermore, it can be provided that in terms of vibration technology all tools and components of the vibration system are always functional, and thus no unacceptable welds are produced due to system wear. In the unmonitored case a significant number of welds can be produced before the damage to the system is noticed. It can then neither be seen how long welding has already occurred using the defective system, nor whether there has been an impact on the quality of these welds.

With the visible occurrence of errors or reduction of the weld quality, but whose cause is not known, it is possible to use the above-described method and the above-described measuring device as a system for fault diagnosis and fault localization.

An ongoing monitoring of the quality of the welding system can be effected either directly or indirectly by characterization of the system state.

An indirect analysis of the system state can also be effected, as described above for monitoring of the weld quality, by measuring voltage and current, or force and deflection, during the welding. The amplitudes of the measurement values, their phase difference and the operating frequency are the basic values here that describe the vibration dynamics of the vibration system of the system. Certain wear phenomena and setup errors are noticeable in the temporal course of these values and are thus detectable. Examples of a well-detectable deterioration of the system state are aging-related wear phenomena of the piezo actuator. Here the regulating can adjust the regulating variable to unusual values in order to achieve the desired physical conditions. This makes noticeable, for example, an unusually low phase difference between current and voltage for the welding application. Since an aging-related wear occurs gradually, it can already be reacted to in a targeted manner by replacing the piezo actuator at a time at which the welds still do not experience any quality reduction.

An example of a detectable set-up error is an incorrectly set height stop of the sonotrode or a height stop not fixedly screwed, which can migrate due to the vibration into another position. In the vibration analysis a noticeable displacing of some measurement values is noticeable with increasingly higher-set height stop, which blocks ever-sooner the movement of the sonotrode downward, as soon as the breakage force of the welds also begins to drop sharply. In one form, these are a reduction of the current amplitude and/or the phase difference between current and voltage. As a result of this, above all the reactive power can strongly decrease.

Further setup errors relate to a tightening moment of the vibration system, defective supporting or clamping, defective vertical units due to defective springs, poorly fixed anvil.

The disclosure is described in more detail in the following with reference to exemplary embodiments and the figures.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3A:
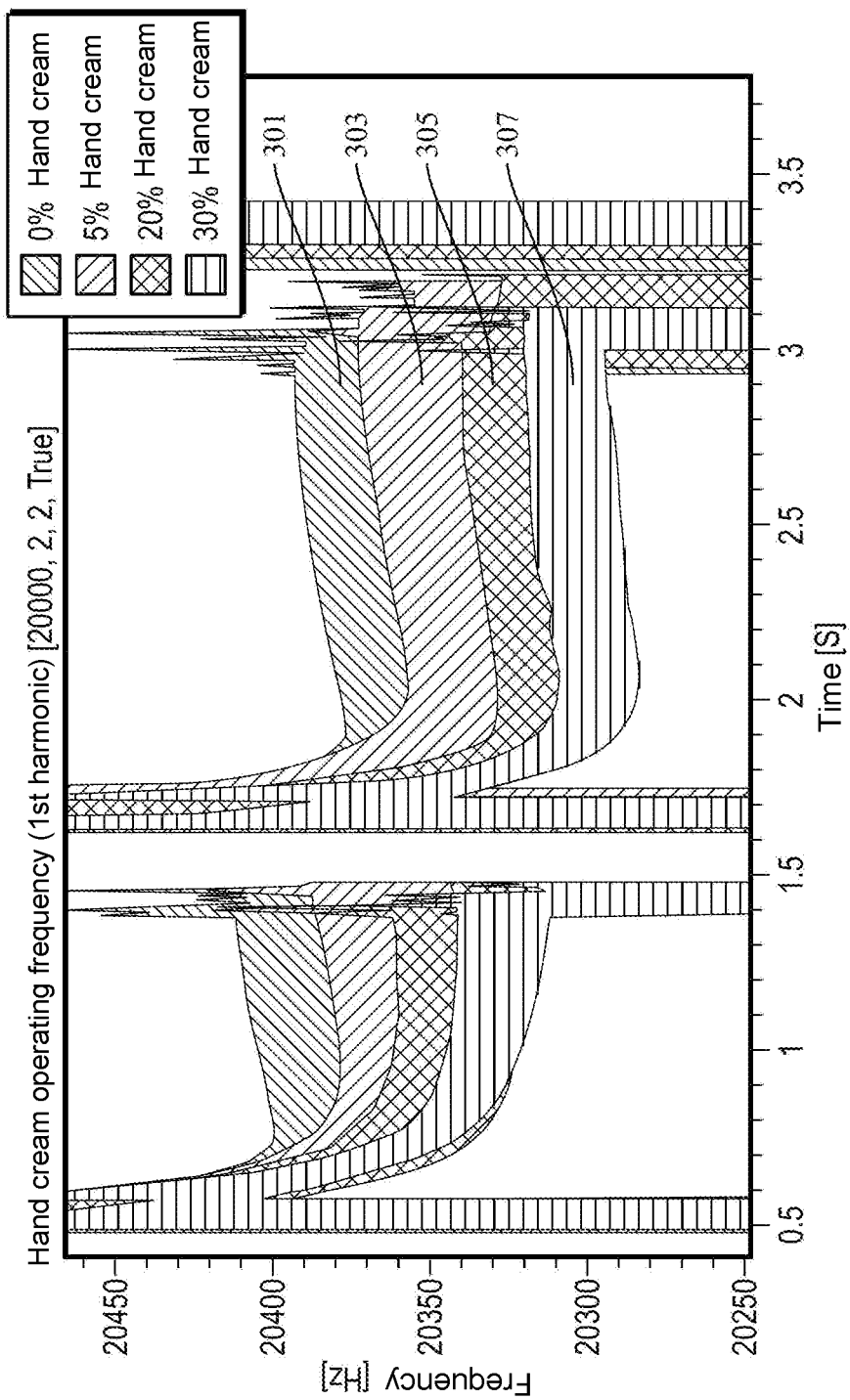
Figure 3B:
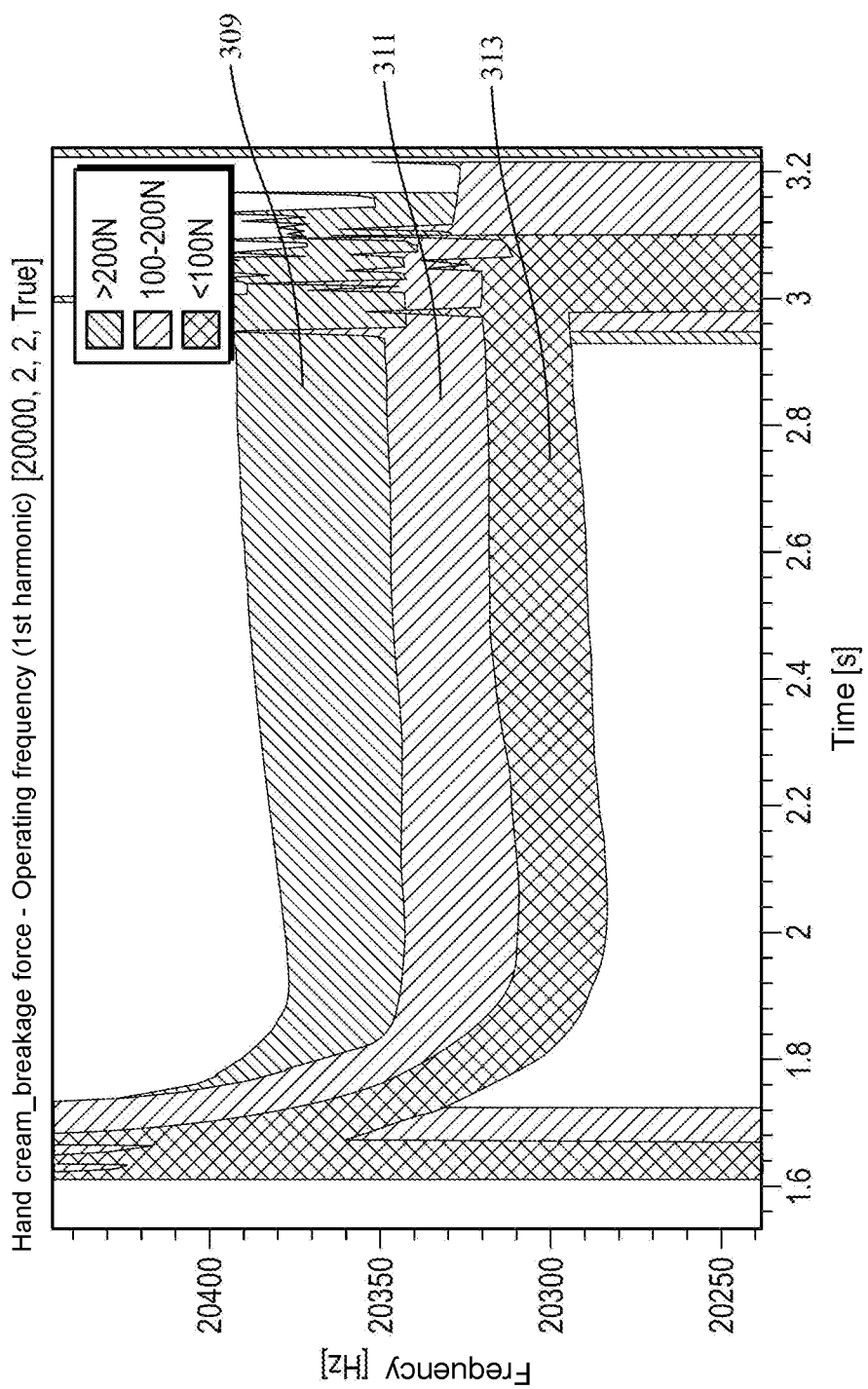
Figure 3C:
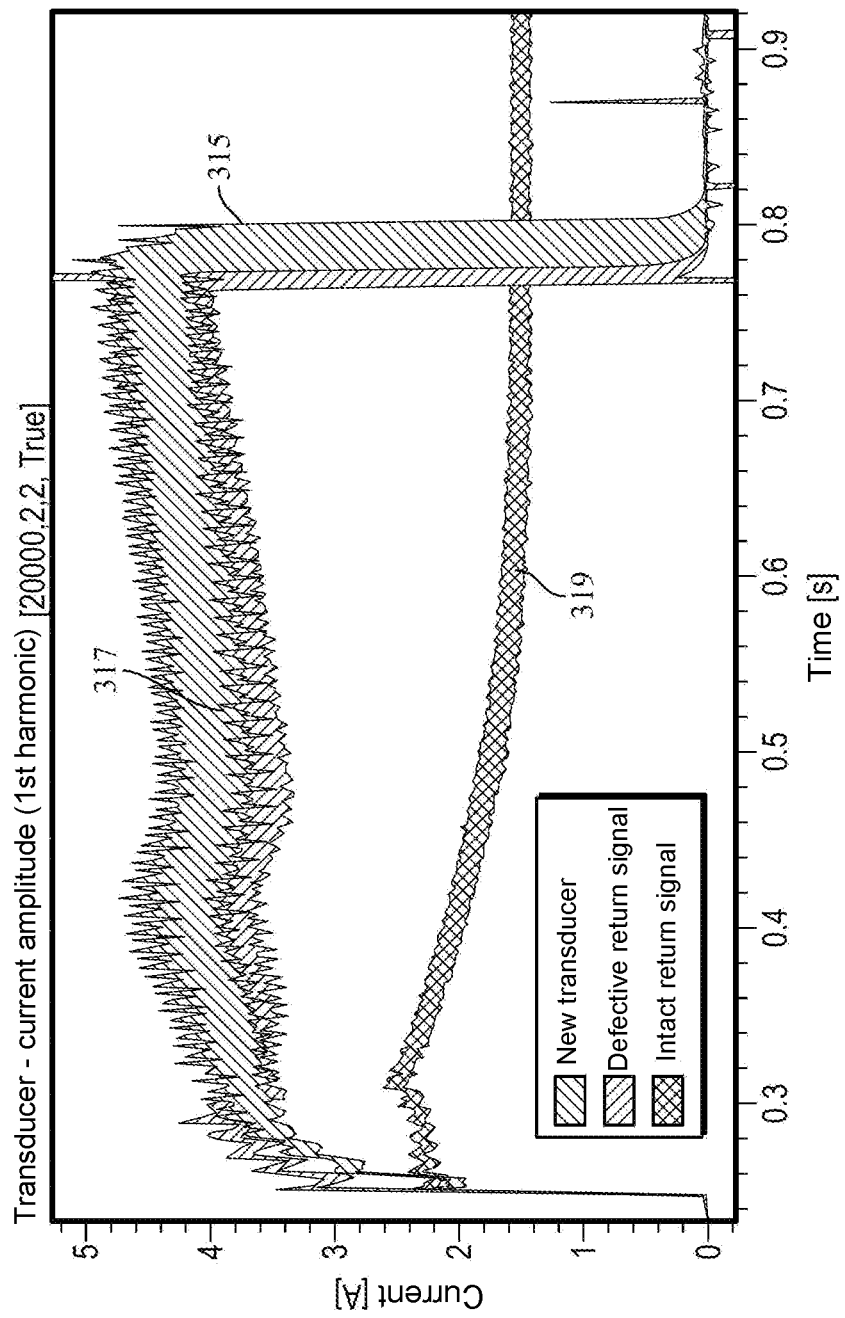
Figure 4:
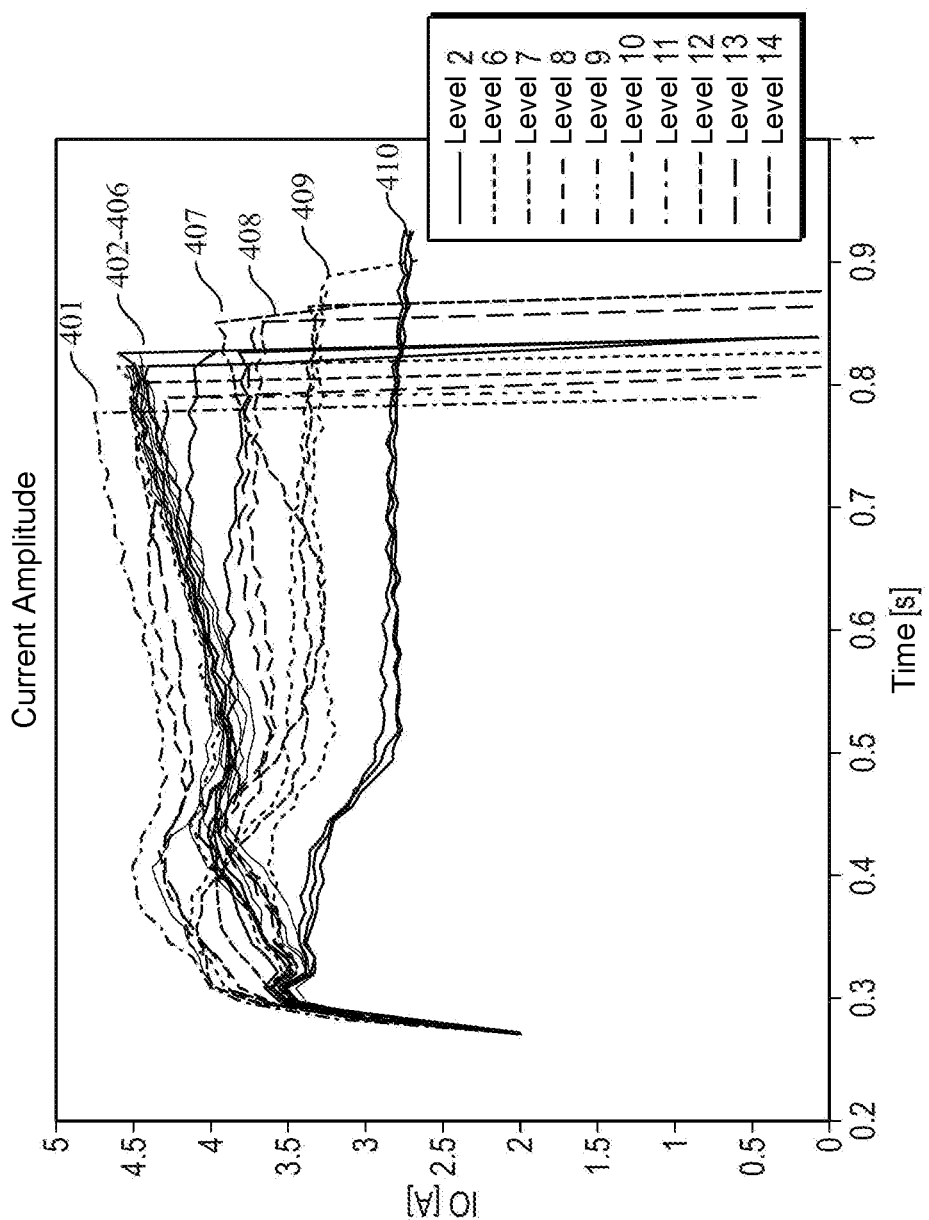
Figure 5:
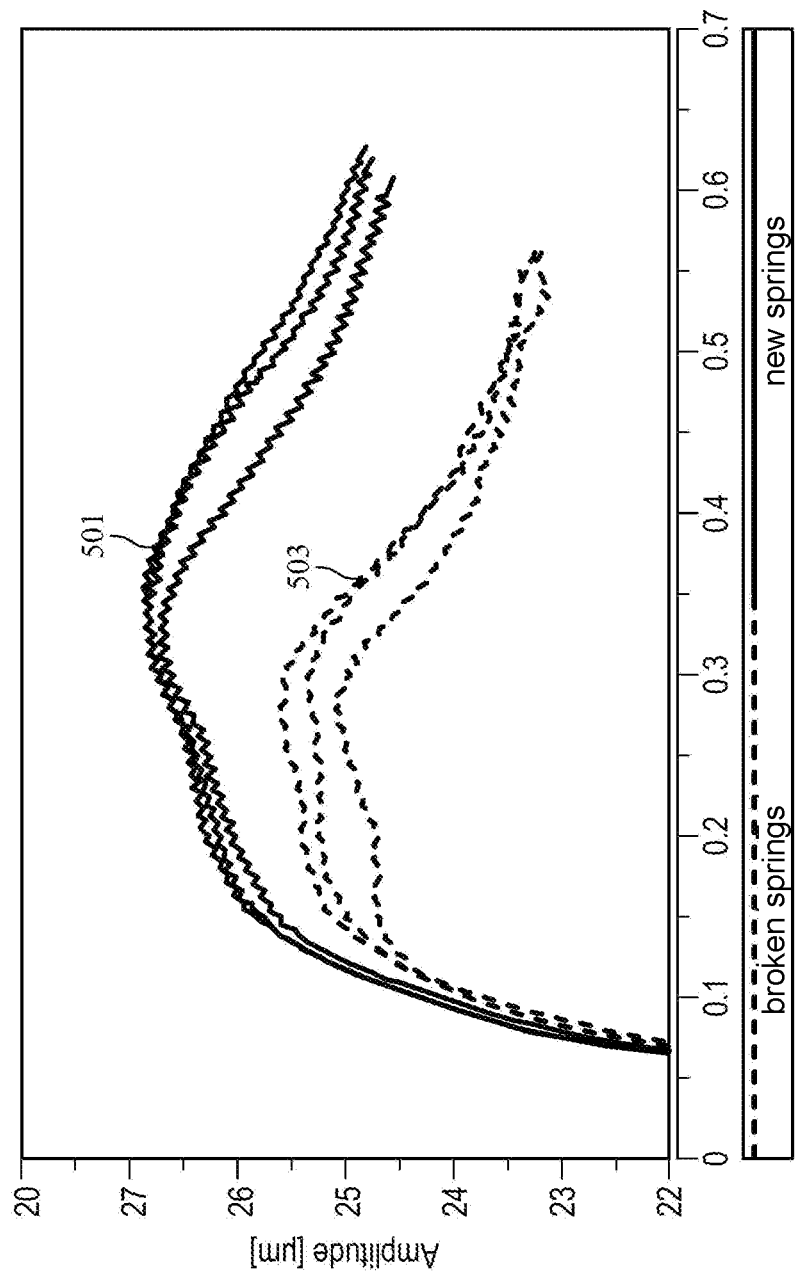

FIG. 3*a* shows a graph of a frequency course according to the teachings of the present disclosure;

FIG. 3*b* shows a graph of a frequency course according to the teachings of the present disclosure;

FIG. 3*c* shows a graph of a current course according to the teachings of the present disclosure;

FIG. 4 shows a graph of a current amplitude course according to the teachings of the present disclosure; and FIG. 5 shows a graph of an amplitude course of a sonotrode deflection according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
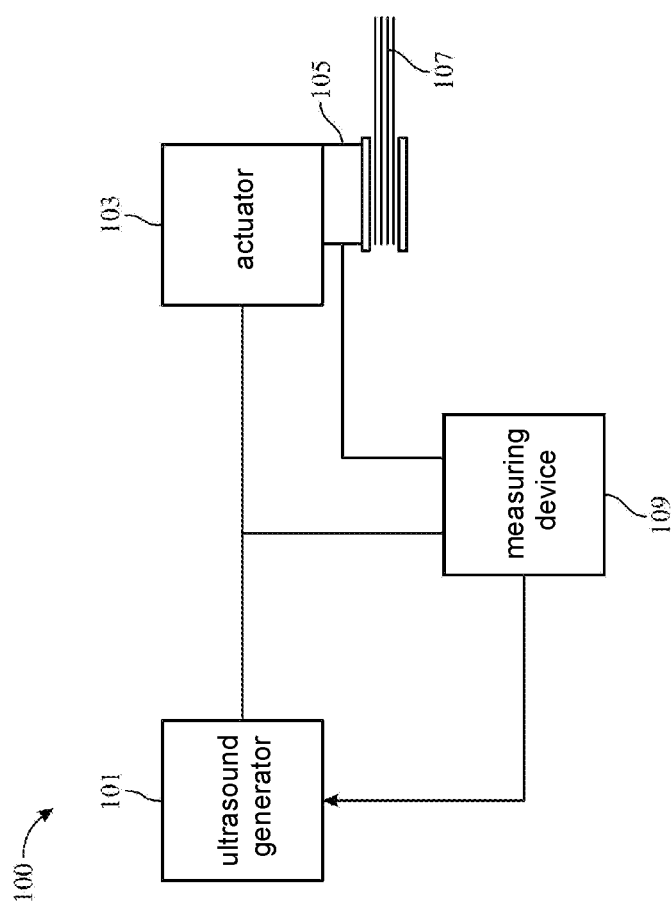
FIG. 1 shows a schematic representation of a welding system in accordance with the teachings of the present disclosure.

FIG. 1 shows a schematic representation of a welding system 100 according to one form of the present disclosure. The welding system 100 is an ultrasonic welding system. The welding system 100 includes an ultrasound generator 101. The ultrasound generator 101 is a signal generator that is configured to generate an electrical signal. The electrical signal is regulated for example according to a voltage and reproduces an ultrasound vibration.

The welding system 100 includes a piezo actuator 103. The piezo actuator 103 is electrically coupled to the ultrasound generator 101 and configured to convert the electrical signal of the ultrasound generator 101 into a mechanical vibration. For this purpose the welding system 100 uses the piezoelectric effect.

A sonotrode 105 is mechanically coupled to the piezo actuator 103. In one form, the sonotrode 105 comprises the piezo actuator 103.

The mechanical ultrasound vibration of the piezo actuator 103 is transmitted to the sonotrode 105 by the mechanical coupling between sonotrode 105 and piezo actuator 103.

A workpiece, in particular a cable packet 107, can be inserted into the sonotrode 105. Here, stripped free ends of the individual cables of the cable packet 107 are inserted into the sonotrode 105.

When the welding system 100 is taken into operation, then the ultrasound generator 101 generates the electrical signal. The piezo actuator 103 converts the electrical signal into a mechanical vibration that is transmitted to the cable packet 107 using the sonotrode 105.

Here, the individual cables of the cable packet 107 are welded to one another.

The welding system 100 comprises a measuring device 109. The measuring device 109 is configured to measure the electrical signal of the ultrasound generator 101. The measuring device 109 is configured to measure a mechanical vibration value on the sonotrode 105. In the electrical signal the measuring device 109 detects a voltage and a current. The current is measured non-invasively via a transformer. In one form, the current is measured via a current-measuring resistance. The mechanical deflection is measured via an eddy current sensor.

In order to obtain reference curves, i.e., a reference value or a target value, cable packets 107 prepared with interferants or without additional measures are welded, and the measurement values are recorded. Subsequently the quality of the weld is verified via an additional test, in particular it is destructively tested.

In this way, a supply of reference curves results that can be associated with a good or bad measurement.

The values measured over the time are subjected to a Fourier analysis, in particular a short-term Fourier analysis. In this evaluation the time behavior of the welding system 100 can be detected in operation.

Unacceptable welds and system states can be detected with this vibration analysis. In this case "unacceptable" means that the welds resulting therefrom have a breakage force below the tolerance limit. The breakage force is prescribed for the reference curves. In operation, it can then be determined using a comparison of the evaluated measurement values to the reference curves, i.e., reference values or target values, whether the welding is good or poor, without having to carry out a breakage test.

It can be difficult to define global characteristic values that apply system-wide and durably as differentiation criterion between good and poor welds for different welding systems 100. Instead, with each test process, in particular after a batch change, a setup process, or a layer change, samples must be welded and tested for their breakage force. Good welds can thereby be determined. From the curve courses of these good welds, a tolerance band is defined that serves for the classification. Welds outside the band are classified as poor welds.

Such a procedure by repeated experiment stems from the fact that the curves differ after each setup, even though the quality of the welds has not changed. The current amplitudes, as well as all derived electrical values also differ depending on the setup process. Only the voltage amplitude remains unchanged in all of the examples.

After each setup process, a new repeated-experiment process can therefore be carried out. Likewise after certain time intervals. With 10 welding samples that have been manufactured 24 hours later, wherein the system has not been reconfigured and has not been used, the curve remains unchanged for the operating frequency; however, the phase difference can decrease significantly.

If, after a setup process or certain time interval, a repeated experiment with 20 welding samples takes place, which welding samples all achieve the prescribed breakage force, then a tolerance band can be defined wherein or in the proximity of which all curves of future good welds should be located. Instead of repeated-experiment curves this can be graphically represented as a repeated-experiment band. Such bands are depicted in FIGS. 3a to 3c.

In one form, only 10 samples have been used. In another form, this number can vary. If all welds were classified as "poor" whose curves are located outside the band, this would mean a too-low selectivity, i.e., many good welds incorrectly classified as poor welds. Therefore the tolerance band that is actually used for classification must be wider. Determining this band can be effected using statistical methods, in particular a widening at each point in time by one or two standard deviations of the 10 measurement values.

For the repeated-experiment welds other physical conditions prevail in part than for the subsequent welds of the series manufacturing. In one form, the line lengths of the cable packets 107 are significantly shorter during the repeated experiments, and the cycle frequency and thus the tool temperature can also differ. It must be provided that these differences have no influence on the measured curves.

Even with large fluctuations the cycle frequency has little influence on any of the measured curves. The operating frequency is most affected.

Figure 2:
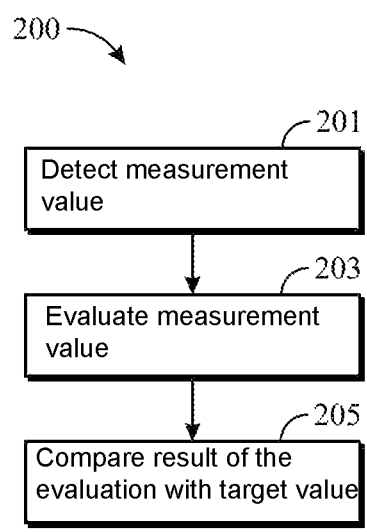
FIG. 2 shows a flow diagram for a method in accordance with the teachings of the present disclosure.

FIG. 2 shows a flow diagram 200 for a method according to one form of the present disclosure.

In a first step 201, measurement values are detected. Here an electrical and mechanical characteristic vibration value is detected over a period of time, in particular the entire welding process. In one form, only electrical or only mechanical measurement values are detected.

In a step 203, the detected measurement values are evaluated. Here the detected time courses for the measurement values are evaluated using a Fourier analysis.

In step 205, the evaluated results are compared to a reference value, in particular a target curve. The reference value here represents a band wherein the curve course should be located.

In order to determine the influence of the line lengths, an investigation with 3-line lengths, each with 2 samples, has been carried out. Generally over different lengths the operating frequencies are located in a band of at most 30 Hz width, which corresponds approximately to the width of the bands in the experiment with respect to the setup process. In addition, the curves of the short line length of 13 cm differ from the others, but 30 cm lines, whose curves hardly differ from those longer lines, are used in the process control in manufacturing. It is thus not assumed that the line length has a significant influence.

After each batch change, breakage tests are carried out in manufacturing for process control. These welds can also be used for a repeated-experiment process. This is necessary since the curves can change significantly due to the batch change without a change of the breakage forces necessarily occurring as well. Using the example of three different batches of nomically identical lines with 10 weld samples each, significantly separated tolerance bands arise with operating frequency, current amplitude, and phase difference, as well as all derived values. The difference is also clearly visible with the harmonic distortion.

FIG. 3a shows a graph of a frequency course according to one form of the present disclosure. Time is plotted on the abscissa axis, and frequency is plotted on the ordinate axis, here in the range of 20250 Hz below and 20450 Hz above.

A realistic example of the reduction of the weld quality is contamination of the weld surface by hand cream. For this experiment a surface proportion of the weld surface has been contaminated with hand cream in a targeted manner through a template.

A curve 301 corresponds to an application of 0% hand cream, a curve 303 corresponds to an application of 5% hand cream, a curve 305 corresponds to an application of 20% hand cream, and a curve 307 corresponds to an application of 30% hand cream.

At the operating frequency it can be clearly seen that the operating frequency decreases with increasing contamination by hand cream. Other values do not allow any change to be seen. Only with very specific values and sections of higher harmonics can a trend be recognized, for example, with the second harmonics in the phase difference during the compression vibration and in the voltage amplitude during the weld vibration, which, however, are not suitable as reliable classifiers, at best as support of the classification by the operating frequency.

The experiment with controlled contamination with hand cream also makes possible the verification that some curves have a correlation with the breakage force. If the weld samples are grouped according to their breakage force, it can be seen that the operating frequency is a good classifier in order to separate, by vibration analysis, very poor samples that have a breakage force under 100N from good samples that have a breakage force over 109N. In this way critical welds can be detected.

FIG. 3b shows a graph of a frequency course according to one form of the present disclosure. The time is plotted on the abscissa axis and the frequency is plotted on the ordinate axis, here in the range of 20250 Hz below and 20450 Hz above.

The curves 309, 311, and 313 show a distribution of the welding samples according to their breakage force. In the curve 309, breakage force over 200 N has been used to destroy the sample. In the curve 311, breakage force over between 100 N and 200 N has been used to destroy the sample. In the curve 313, breakage force under 100 N has been used to destroy the sample.

The vibration analysis can detect defects on the welding system 100. If damage occurs to the transducer, this damage is very clearly visible on the curves. The current amplitude decreases strongly, and the phase difference increases. As a result, the transducer is no longer in the position to introduce sufficient power into the joining zone, whereby the weld time also increases significantly, and no materially-bonded connection arises.

FIG. 3c shows a graph of a current course according one form of the present disclosure. The time is plotted on the abscissa axis, and the current is plotted on the ordinate axis, here in the range of 0 A below and 5 A above.

The curve 315 shows the current course of a new transducer, the curve 317 shows the current course of an intact, used transducer, and the curve 319 shows the current course of a defective, used transducer. It can be clearly seen that the curve 319 drops sharply. The state of the transducer can thus be detected.

Setup errors that cause a change of the boundary conditions for the vibration can also be detected. If, for example, during setup it is forgotten to fixedly screw the height stop, in the course of multiple vibrations the height stop can slip upward and during the welding the sonotrode 105 is still in motion when hitting the stop, and should exert further normal pressure on the weld nodes. In part this cannot be proven using weld-height monitoring and weld-time monitoring, even though the breakage forces have already dropped significantly.

FIG. 4 shows a graph of a current course according to one form of the present disclosure. The time is plotted on the abscissa axis, and the current is plotted on the ordinate axis, here in the range of 0 A below and 5 A above.

Here 10 curves 401 to 410 are plotted over time. The curves 402 to 406 are close to each other, and the current increases. However, the curves 407 to 410 fall sharply. It can be derived from this that in these runs the height stop has been incorrectly set.

Using the mechanical vibration measurement, i.e., using the measuring of the deflection of the sonotrode 105, a system defect in the welding system 100 can be detected. After the checking of the system thereby bumped, a spring breakage can be detected.

FIG. 5 shows a graph of an amplitude course of a sonotrode deflection according to one form of the present disclosure. The curves 501 show a course with new springs. The curves 503 show a course with broken springs. A decrease of the amplitude is clearly visible.

Also with the mechanical vibration analysis it is to be noted that different welding systems 100 show different curves, thus for analysis a system-specific reference curve is advantageous. As with the electrical vibration analysis, a repeated-experiment process is advantageous for detecting poor weld quality. Different line batches already lead to significantly changed curves. However, contact-part batches have no influence in this experiment.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for non-destructive testing of a quality of an ultrasonic weld from a welding process, the welding process being performed by an ultrasonic welder including a sonotrode, the method comprising:
   inserting a cable packet into the sonotrode;
   detecting a time-dependent measurement value over a period of time, wherein the time-dependent measurement value is characteristic of a mechanical or electrical vibration behavior of the welding process;
   evaluating a measurement-value course of the detected time-dependent measurement value by using a Fourier analysis; and
   comparing a result of the evaluation to a reference value in order to test the quality of the ultrasonic weld,
   wherein the detecting of the time-dependent measurement value comprises detecting a differential value and a flow value.

2. The method according to claim 1, wherein the period of time corresponds to a duration of the welding process.

3. The method according claim 1, wherein the time-dependent measurement value is characteristic of a mechanical vibration behavior of the welding process, the mechanical vibration behavior comprising a shear force and a deflection of a sonotrode.

4. The method according to claim 1, wherein the time-dependent measurement value is characteristic of an electrical vibration behavior of the welding process, the electrical vibration behavior comprising at least one of an electrical current or an electrical voltage for controlling a piezo actuator.

5. The method according to claim 1, wherein the evaluating comprises calculating of a phase relationship of at least one of two detected time-dependent measurement values, an operating frequency for operating a sonotrode, an amplitude of a phase of a detected time-dependent measurement value, or an amplitude of the operating frequency for operating a sonotrode.

6. The method according to claim 5, wherein the evaluating further comprises deriving of a power value from a calculated phase relationship of two detected time-dependent measurement values.

7. The method according to claim 6, wherein the power value is at least one of an apparent power, an active power, a reactive power, or an impedance value.

8. The method according to claim 7, wherein the impedance value is at least one of an apparent resistance, resistance, or reactance.

9. The method according to claim 1, wherein the evaluating the measurement-value course is based on at least one of a fundamental oscillation or a harmonic of the time-dependent detected measurement value.

10. The method according to claim 1, wherein the comparing the result of the evaluation to the reference value comprises comparing at least one of an operating frequency or a phase difference between an electrical current or an electrical voltage for controlling a piezo actuator.

11. The method according to claim 1, wherein a reference-value determination precedes the detecting and is based on at least one of a test series or a self-learning algorithm.

12. The method according to claim 11, wherein the self-learning algorithm is a neural network.

13. The method according to claim 1, further comprising regulating the welding process based on a result of a comparison of the result of the evaluation to the reference value.

14. The method according to claim 1, further comprising adapting a parameter of a welding system carrying out the welding process based on the result of the comparing.

15. The method according to claim 1, further comprising a vibration analysis for representing dynamics of the welding process based on the comparing, in order to detect an under- or an over-welding.

16. An ultrasonic welding system comprising:
   a sonotrode for applying a mechanical force to a workpiece;
   a cable packet inserted into the sonotrode;
   a piezo actuator configured to convert an electrical control signal into a mechanical vibration and to transmit the mechanical vibration to the sonotrode;
   an ultrasound generator configured to provide the electrical control signal; and
   a measuring device configured to:
      detect a measurement value over a period, wherein the measurement value is characteristic of a mechanical or electrical vibration behavior of a welding process to be tested;
      evaluate the detected measurement value by using a Fourier analysis; and
      compare a result of the evaluation to a reference value in order to test the quality of the weld.

* * * * *